United States Patent [19]

Rauer et al.

[11] Patent Number: 4,683,248
[45] Date of Patent: Jul. 28, 1987

[54] CROSSLINKING OF STYRENE POLYMERS

[75] Inventors: Kurt Rauer; Angelika Orner, both of Gunzburg, Fed. Rep. of Germany

[73] Assignee: Luperox GmbH, Gunzburg, Fed. Rep. of Germany

[21] Appl. No.: 782,834

[22] Filed: Oct. 2, 1985

[30] Foreign Application Priority Data

Oct. 8, 1984 [DE] Fed. Rep. of Germany ....... 3436877

[51] Int. Cl.$^4$ .............................................. C08J 9/06
[52] U.S. Cl. ........................................ 521/96; 521/59;
521/139; 521/140; 521/145; 521/146; 521/150;
525/263; 525/265; 525/303; 525/305
[58] Field of Search ................... 521/59, 96, 139, 140,
521/145, 150, 146

[56] References Cited

U.S. PATENT DOCUMENTS

| 3,058,928 | 10/1962 | Eichhorn et al. | 521/56 |
|---|---|---|---|
| 3,432,447 | 3/1969 | Patterson | 521/50.5 |
| 3,743,611 | 7/1973 | Muroi et al. | 521/60 |
| 3,965,054 | 6/1976 | Nojiri et al. | 521/96 |
| 4,272,583 | 6/1981 | Kahn | 521/96 |
| 4,433,029 | 2/1984 | Seuda et al. | 521/60 |

FOREIGN PATENT DOCUMENTS 1259094 8/1961 France.

Primary Examiner—Morton Foelak

[57] ABSTRACT

Optionally nucleo-substituted styrene polymers are crosslinked at temperatures above 110° C. with combinations of crosslinkage promoters containing at least two polymerizable C—C double or C—C triple bonds in the molecule, and organic peroxides (with the exception of hydroperoxides, peracids, and ketone peroxides) having a 10 hour halflife temperature below 106° C.

4 Claims, No Drawings

CROSSLINKING OF STYRENE POLYMERS

The invention relates to a process for crosslinking and optionally foaming optionally nucelo-substituted polystyrenes, copolymers thereof with one another, impact-resistant polystyrenes, or mixtures of said polymers with one another, with the exception of p-methylstyrene homopolymers.

European Patent No. 0 013 073 discloses the crosslinkage of p-methylstyrene homopolymers or copolymers by means of ionizing radiation (e.g. electron beams) in combination with polyunsaturated monomers (e.g. divinylbenzene, trimethylolpropane triacrylate, allyl methacrylate, trimethylolpropane trimethacrylate, ethylene glycol dimethacrylate). In the only example of said patent poly(p-methylstyrene) containing 5% trimethylolpropane trimethacrylate is irradiated with an electron beam at a dosage of 2 to 22 mrad at room temperature; the dosage of 22 mrad effected 70% crosslinkage of the poly(p-methylstyrene). In said example an attempt has been made to crosslink also polystyrene under the same conditions, but it failed (degree of crosslinkage: 0%).

European Patent Publication No. 0 047 050 describes the crosslinkage of poly(p-methylstyrene) by means of ionizing radiation (e.g. electron beams) in combination with triallyl cyanurate or triallyl isocyanurate at room temperature whereby degrees up to 100% of crosslinkage were attained. It is particularly surprising that this object can be realized with the use of specific peroxides, namely peroxides having 10 hour halflife temperatures below 106° C., especially aromatic peresters (e.g. tert.-butyl peroxybenzoate), or aromatic diacyl peroxides (e.g. benzoyl peroxide), in combination with crosslinkage promoters.

Hence, the subject matter of the invention is a process for crosslinking and optionally foaming optionally nucleo-substituted polystyrenes, copolymers thereof with one another, or impact-resistant polystyrenes with one another, with the exception of p-methylstyrene homopolymers, which is characterized in that crosslinkage is effected by means of combinations of 0.5 to 15% of at least one crosslinkage promotor containing at least two active (=polymerizable) C—C double or C—C triple bonds in the molecule, and 0.5 to 15% of at least one organic peroxide (with the exception of hydroperoxides, peracids, and ketone peroxides) having a 10 hour halflife temperature below 106° C. (determined in benzene) at temperatures above 110° C., optionally in the presence of foaming agents.

The crosslinkage of styrene polymers is not feasible with peroxides alone, or with crosslinkage promoters alone. Even combinations of typical crosslinkage initiators (e.g. dicumyl peroxide or the azo ester 2,2'-acetoxy-4-methylpentane) with crosslinkage promoters are completely ineffective.

Crosslinkage preferably takes place in the substantial or complete absence of atmospheric oxygen, most favorably under nitrogen as protective gas. However, it is also possible in the presence of oxygen, e.g. in air.

Styrene polymers of the type mentioned infra, which were crosslinked according to the process of the invention, are superior to the corresponding non-crosslinked styrene polymers owing to their substantially lower solubility in organic solvents,
their higher softening point, and
their greater hardness.

The following groups come into consideration as nucleus substituents (i.e., benzene ring substituted) for styrene homopolymers:

(1) $C_{1-10}$ alkyl, especially methyl, ethyl, isopropyl,
(2) $C_{1-10}$ alkoxy, especially $CH_3O—$,
(3) $C_{1-10}$ alkoxycarbonyl, especially $CH_3O—CO—$,
(4) $C_{1-10}$ alkylcarbonyl, especially $CH_3—CO—$,
(5) chloro,
(6) phenyl,
(7) phenyloxy,
(8) phenyloxy carbonyl,
(9) phenylcarbonyl.

The radicals (6) to (9) in the phenyl moiety may, in turn, be substituted by the radicals (1) to (5). Poly(p-methylstyrene) does not come into consideration.

Preferred examples for nucleo-substituted polystyrenes are poly(chlorostyrene) and poly(isopropyl styrene).

The styrene copolymers may be selected from the group of styrene with nucleo-substituted styrenes, or from at least 2 nucleo-substituted styrenes including p-methylstyrene. An example is poly(vinyltoluene) (=copolymer or ortho, para, and meta-methylstyrene).

Impact-resistant polystyrenes in the purview of this invention are graft polymers, copolymers, or polymer mixtures consisting of a major proportion of styrene and/or nucleo-substituted styrene and a minor proportion of the elastifying rubber component responsible for the impact strength, and optionally a third or fourth monomeric component (such as acrylate, methacrylate, or vinyl acetate). Prefably the rubber component is present in an amount up to 25%, based on the total weight of polymer.

Examples for such impact-resistant polystyrenes are graft polymers of styrene or p-methylstyrene to ethylene/propylene/diene terpolymer (=EPDM); graft polymers of styrene or p-methylstyrene to ethylene/propylene copolymer (=EPM); graft copolymers of styrene or p-methylstyrene to polybutadiene; graft polymers of styrene or p-methylstyrene and vinyl acetate to EPDM; graft polymers of styrene and methylmethacrylate to EPDM; graft polymers of styrene or p-methylstyrene and vinyl acetate as well as methyl methacrylate to EPDM; graft polymers of styrene or p-methyl styrene to EPDM and ethylene/vinyl acetate copolymer (=EVA); graft polymers of styrene and acrylonitrile to polybutadiene (=ABS); copolymers of a major proportion of styrene and a minor proportion of butadiene; mechanical mixtures of polystyrene and butadiene/styrene rubber.

Suitable crosslinkage promoters are compounds containing at least two, preferably at least three active (=polymerizable) C—C double or C—C triple bonds. Examples for such compounds are allyl compounds, for example allyl derivatives of cyanuric acid or isocyanuric acid (such as triallyl cyanurate, triallyl isocyanurate, N,N'-bis(4,6-diallyloxy-s-triazinyl-(2))-1,2-diaminoethane, N,N'-bis(4,6-diallyloxy-s-triazinyl-(2))-1,6-diaminohexane, N,N'-bis(4,6-diallyloxy-s-triazinyl-(2))-piperazine, 2-butylamino-4,6-diallyloxy-s-triazine); allyl esters of dibasic or polybasic carboxylic acids (such as triallyl trimellitate, triallyl citrate, acetyl triallyl citrate; diallyl terephthalate, diallyl isophthalate, diallyl orthophthalate; diallyl succinate, diallyl glutarate, diallyl adipate, diallyl azelate; diallyl hexahydrophthalate); allyl esters of dibasic or polybasic inorganic acids (such as triallyl phosphate);

allyl ethers of dihydric or polyhydric alcohols (such as trimethylolpropane triallylether, tetraallyl oxyethane (=tetraallylacetal of glyoxal); 2- or multiple N-allyl-substituted acid amides or imides (such as N,N-diallyl caprinamide, N,N,N',N'-tetraallyl adipic acid diamide, N,N,N',N'-tetraallyl terephthalic acid diamide); "mixed" compounds containing two or more active C—C double bonds (such as allyl methacrylate, diallyl maleate, diallyl-4-tetrahydrophthalate;

methallyl compounds corresponding to the above mentioned allyl compounds, e.g. trimethallyl cyanurate;

crotyl compounds corresponding to the above mentioned allyl compounds, e.g. tricrotyl cyanurate;

methacrylic esters of dihydric or polyhydric alcohols, such as trimethylolpropane trimethacrylate, ethylene glycol dimethacrylate, hexanediol-(1,6)dimethacrylate;

acrylic esters corresponding to the above mentioned methacrylic esters of dihydric or polyhydric alcohols, e.g. trimethylolpropane triacrylate;

divinyl or polyvinyl compounds, e.g. divinylbenzene;

compounds containing C—C triple bonds, e.g. tripropargyl trimellitate, or the "mixed" compound dipropargyl maleate;

maleimides, e.g. m-phenylene bismaleimide, 4,4'-bis-maleimide diphenylmethane, tris-, tetrakis- or pentakis-maleimides of the formula I wherein n=1, 2, or 3:

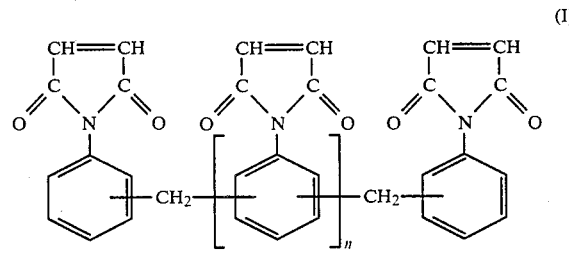

(I)

Crosslinkage promoters containing 3 allyl groups as well as divinylbenzene, or diallyl maleate, are preferred.

The amount of crosslinkage promoter employed preferably ranges from 1 to 7% by weight, based on polymer.

Suitable organic peroxides are compounds with 10 hour halflife temperatures (=10 hHT) below 106° C. (in benzene solution), with the exception of hydroperoxides, peracids, and ketone peroxides (=reaction products of ketones with $H_2O_2$). Examples for these peroxides are peresters, e.g. tert.-butyl peresters (such as tert.-butyl peroxybenzoate (10 hHT=105° C.), tert.-butylperoxy-3,5,5-trimethylhexanoate (10 hHT=102° C.), tert.-butylperoxy-o-methylbenzoate (10 hHT=about 95° C.), tert.-butyl peroxyisobutyrate (10 hHT=79° C.), tert.-butylperoxy-2-ethylhexanoate (10 hHT=73° C.), tert.-butyl peroxypivalate (10 hHT=55° C.), tert.-butyl peroxyneohexanoate (10 hHT=51° C.), tert.-butyl peroxyneoheptanoate (10 hHT=50° C.), tert.-butyl peroxyneodecanoate (10 hHT=47° C.); peresters of 2,5-dihydroperoxy-2,5-dimethylhexane (such as 2,5-bis(benzoylperoxy)-2,5-dimethylhexane (10 hHT=100° C.), 2,5-bis(2-ethylhexanoylperoxy)-2,5-dimethylhexane (10 hHT=68° C.)); tert.-amyl peresters (such as tert.-amylperoxybenzoate (10 hHT=101° C.), tert.-amylperoxy-2-ethyl hexanoate (10 hHT=69° C.)); 1,1,3,3-trimethylbutyl peresters (=tert.-octyl peresters) (such as tert.-octyl peroxybenzoate (10 hHT=about 97° C.), tert.-octylperoxy-2-ethylhexanoate (10 hHT=about 65° C.)); cumyl peresters (such as cumyl peroxybenzoate (10 hHT=about 96° C.), cumylperoxy-2-ethyl hexanoate (10 hHT=about 64° C.));

percarbonate esters, e.g. tert.-butylpercarbonate esters (such as O-cyclohexyl-O,O-tert.-butyl monoperoxycarbonate (10 hHT=99° C.), O-2-ethylhexyl-O,O-tert.-butyl monoperoxycarbonate (10 hHT=99° C.), O-myristyl-O,O-tert.-butyl monoperoxycarbonate (10 hHT=99° C.)) and the alalogous tert.-amyl, tert.-octyl, cumyl peresters;

perketals, e.g. tert.-butyl perketals (such as 2,2-bis(-tert.-butylperoxy)propane (hHT=101° C.), 2,2-bis(-tert.-butylperoxy)butane (10 hHT=100° C.), 2,2-bis(-tert.-butylperoxy)-4-methylpentane (10 hHT=100° C.), 1,1-bis(tert.-butylperoxy)cyclohexane (10 hHT=93° C.), 1,1-bis(tert.-butylperoxy)-3,3,5-trimethylcyclohexane (10 hHT=92° C.)) and the analogous tert.-amyl, tert.octyl, cumyl perketals;

ether peroxides, e.g. tert.butyl ether peroxides (such as 2-tert.-butylperoxy-2-butoxypropane (10 hHT=about 98° C.), 1-tert.-butylperoxy-1-methoxycyclohexane (10 hHT=about 92° C.), 1-tert.-butylperoxy-1-butoxycyclohexane (10 hHT=about 99° C.), 1-tert.-butylperoxy-1-methoxy-3,5,5-trimethylcyclohexane (10 hHT=about 91° C.), and the analogous tert.-amyl, tert.-octyl, cumyl ether peroxides;

diacyl peroxides, e.g. aromatic diacyl peroxides (such as benzoyl peroxide (10 hHT=73° C.), o-methylbenzoyl peroxide (10 hHT=69° C.)) and aliphatic diacyl peroxides (such as lauroyl peroxide (10 hHT=62° C.), decanoyl peroxide (10 hHT=61° C.), 3,3,5-trimethylhexanoyl peroxide (10 hHT=59° C.);

ketone peroxide esters, e.g. 2,2'-bis(benzoylperoxy)-butyl-(2)peroxide, 1,1-bis(benzoylperoxy)cyclohexane, 1,1'-bis-(benzoylperoxy)-cyclohexyl-(1)peroxide, 1,1-bis(benzoylperoxy)-3,3,5-trimethyl cyclohexane, 1,1-bis(benzoylperoxy)-3,3,5-trimethyl cyclohexane, 1,1'-bis(benzoylperoxy)-3,3,5-trimethyl-cyclohexyl-(1)peroxide.

Aromatic peroxides, such as tert.-butyl peroxybenzoate, tert.-butylperoxy-o-methylbenzoate, benzoyl peroxide, o-methylbenzoyl peroxide are preferred. However, also percarbonate esters such as O-2-ethylhexyl-O,O-tert.-butyl monoperoxycarbonate or O-cyclohexyl-O,O-tert.-butyl monoperoxycarbonate have proved to be effective crosslinking agents.

The organic peroxide is preferably used in amounts from 2 to 7% by weight, based on the amount of polymer employed.

Crosslinkage according to the present invention can also take place in the presence of antioxidants, antiozonants, fillers (e.g. carbon black, calcium carbonate, talcum, calcium silicate, aluminum silicate, kaolin, silicic acid, $SiO_2$), glass fibers, pigments, UV stabilizers, foaming agents, e.g. 2,2'-azo-bis-isobutyramide, 2,2'-azo-bis-(ethyl isobutyrate)), flame retardants, antistatic agents, lubricants, plasticizers, or other additives.

The energy required for crosslinkage can be supplied by (a) direct contact of the polymer to be crosslinked with a preheated material, e.g. steel, molten metal, molten salt, water (steam), air, nitrogen;

(b) electromagnetic radiation, e.g. infrared, ultrahigh frequency (=microwave), X-ray, gamma ray; or (c) particle radiation, e.g. alpha or beta ray (=electron beam).

In the process of the invention the polymer employed may be foamed concurrently with crosslinkage. To this end conventional foaming agents are added to the polymer, for example amides or esters containing no free amino or hydrazino group. Examples for such agents are azo-isobutyramide and ethyl azo-isobutyrate.

In case the crosslinkage is carried out with ether peroxides or perketals, also conventional foaming agents containing free amino or hydrazino groups can be employed.

The invention will now be explained by the following examples:

EXAMPLES

The percentages of the additives to the polystyrene are by weight and are based on the total weight of the polymers.

Crosslinkage of the polystyrene was carried out in the absence of oxygen in a nitrogen atmosphere. The styrene homopolymer was ground to powder (e.g. in a coffee grinder). The impact-resistant polystyrenes were used in granular form, as it was impossible to pulverize them in a simple way. Crosslinkage promoters, peroxide, and optionally other additives, were incorporated into the polystyrene by stirring in a beaker. After the addition of 3 ml acetone per 2 grams polystyrene the mixture was stirred again. The acetone was removed in a drying cabinet at 70° C. (from the powdered styrene the acetone was removed 1 to 2 hours after mixing; from the impact-resistant styrene granules the acetone was removed within 15 hours, after the mixture had been left to stand for 12 to 24 hours in a sealed vessel at room temperature). Crosslinkage of the polystyrene took place in a test tube which was flushed with nitrogen to displace atmospheric oxygen before being sealed. For crosslinkage the test tubes sealed by fusion were placed into a drying cabinet preheated to the desired crosslinking temperature. A period of 9 to 12 minutes was required to heat up the polystyrene to the selected crlsslinking temperature; the test tube remained in the drying cabinet for the time listed in the tables as crosslinking period plus said preheating period.

In order to determine the degree of crosslinkage; the crosslinked polystyrene was divided into medium-sized granules by means of pincers and was loosely packed into a previously weighed high-grade stainless steel wire net. Thereafter the polystyrene in the net was weighed and extracted for 1 hour with boiling xylene (80 ml per 1 gram polystyrene) at reflux. After crosslinkage the net plus contents was immersed in warm xylene for rinsing and thereafter heated in the drying cabinet for 1 hour at 160° C. In order to determine the weight loss, the material was weighed again after cooling. The amount of the insoluble portion (=gel) of crosslinked polymer that remained in the net, multiplied by 100 and divided by the original amount of polymer, indicates the degree of crosslinkage. Non-crosslinked polystyrene is completely dissolved under the above described conditions. A polystyrene in which each polymer chain forms at least one crosslinking bridge to another chain is completely insoluble in boiling xylene.

EXAMPLE 1

Powdered polystyrene (melt index (200/5.0)=9 g/10 min) was crosslinked for 40 minutes at 195° to 200° C. under nitrogen by combinations of various quantities of tert.-butyl peroxybenzoate (=perb.) as crosslinking agent and various quantities of triallyl cyanurate (=TAC) as crosslinkage promoter.—For comparison attempts were made to crosslink polystyrene with 0.5 to 10% of tert.-butyl peroxybenzoate in the absence of triallyl cyanurate, and also with 1 to 10% of triallyl cyanurate in the absence of tert.-butyl peroxybenzoate, and with 1 to 10% of divinylbenzene in the absence of tert.-butyl peroxybenzoate.

Example 1 shows that with triallyl cyanurate alone, and with divinylbenzene alone, almost no crosslinkage took place; that with customary amounts of tert.-butyl peroxybenzoate crosslinkage does not take place either; and that only large amounts of peroxybenzoate (9%, 10%) bring about a minor degree of crosslinkage. It also shows that with combinations of minor amounts of peroxide and crosslinkage promoter only insignificant (=minor) crosslinkage is effected, and that larger quantities of peroxide and crosslinkage promoter are required to attain good degrees of crosslinkage:

| Additives | Degree of Crosslinkage |
|---|---|
| 0.5% perbenzoate (= perb.) | 0.2% |
| 1% perbenzoate (= perb.) | 0.4% |
| 2% perbenzoate (= perb.) | 0.5% |
| 3% perbenzoate (= perb.) | 0.7% |
| 4% perbenzoate (= perb.) | 0.9% |
| 5% perbenzoate (= perb.) | 1.5% |
| 6% perbenzoate (= perb.) | 3.6% |
| 7% perbenzoate (= perb.) | 8.8% |
| 8% perbenzoate (= perb.) | 7.7% |
| 9% perbenzoate (= perb.) | 23% |
| 10% perbenzoate (= perb.) | 20% |
| 1% triallyl cyanurate (= TAC) | 0.9% |
| 2% triallyl cyanurate (= TAC) | 0.7% |
| 3% triallyl cyanurate (= TAC) | 0.6% |
| 4% triallyl cyanurate (= TAC) | 0.8% |
| 5% triallyl cyanurate (= TAC) | 0.6% |
| 6% triallyl cyanurate (= TAC) | 0.7% |
| 7% triallyl cyanurate (= TAC) | 0.3% |
| 8% triallyl cyanurate (= TAC) | 0.6% |
| 9% triallyl cyanurate (= TAC) | 0.8% |
| 10% triallyl cyanurate (= TAC) | 0.9% |
| 2% perb + 1% TAC | 4% |
| 2% perb + 2% TAC | 9% |
| 2% perb + 3% TAC | 12% |
| 2% perb + 4% TAC | 36% |
| 2% perb + 5% TAC | 61% |
| 2% perb + 5% TAC | 75% |
| 2% perb + 7% TAC | 77% |
| 2% perb + 8% TAC | 77% |
| 2% perb + 9% TAC | 78% |
| 2% perb + 10% TAC | — |
| 3% perb + 1% TAC | 7% |
| 3% perb + 2% TAC | 38% |
| 3% perb + 3% TAC | 63% |
| 3% perb + 4% TAC | 69% |
| 3% perb + 5% TAC | 74% |
| 3% perb + 6% TAC | 74% |
| 3% perb + 7% TAC | 73% |
| 3% perb + 8% TAC | 74% |
| 3% perb + 9% TAC | 73% |
| 3% perb + 10% TAC | 76% |
| 4% perb. + 1% TAC | 13% |
| 4% perb. + 2% TAC | 51% |
| 4% perb. + 3% TAC | 65% |
| 4% perb. + 4% TAC | 68% |
| 4% perb. + 5% TAC | 72% |
| 4% perb. + 6% TAC | 75% |
| 4% perb. + 7% TAC | 78% |
| 4% perb. + 8% TAC | 73% |
| 4% perb. + 9% TAC | 76% |
| 4% perb. + 10% TAC | 71% |
| 5% perb. + 1% TAC | 26% |
| 5% perb. + 2% TAC | 51% |
| 5% perb. + 3% TAC | 76% |
| 5% perb. + 4% TAC | 77% |
| 5% perb. + 5% TAC | 72% |
| 5% perb. + 6% TAC | 74% |
| 5% perb. + 7% TAC | 72% |

-continued

| Additives | Degree of Crosslinkage |
|---|---|
| 5% perb. + 8% TAC | 71% |
| 5% perb. + 9% TAC | 74% |
| 5% perb. + 10% TAC | 65% |
| 0.5% perb. + 5% TAC | 8% |
| 1% perb. + 5% TAC | 34% |
| 2% perb. + 5% TAC | 60% |
| 3% perb. + 5% TAC | 67% |
| 4% perb. + 5% TAC | 71% |
| 5% perb. + 5% TAC | 75% |
| 6% perb. + 5% TAC | 70% |
| 7% perb. + 5% TAC | 74% |
| 8% perb. + 5% TAC | 74% |
| 1% divinylbenzene (at 180° C.) | 0.3% |
| 3% divinylbenzene (at 180° C.) | 5.3% |
| 5% divinylbenzene (at 180° C.) | 36% |
| 6% divinylbenzene (at 180° C.) | 15% |
| 7% divinylbenzene (at 180° C.) | 26% |
| 8% divinylbenzene (at 180° C.) | 20% |
| 9% divinylbenzene (at 180° C.) | 17% |
| 10% divinylbenzene (at 180° C.) | 20% |

EXAMPLE 2

This example is a modification of Example 1; the crosslinking temperature, however, was 150° C., i.e. 50° C. lower than in Example 1.

Polystyrene powder (melt index $(200/5.0)=9$ g/10 min) was crosslinked for 40 minutes at 150° C. under nitrogen by means of combinations of various quantities of tert.-butyl peroxybenzoate (=perb) as crosslinking agent and various amounts of triallyl cyanurate (=TAC) as crosslinkage promoter.

Like Example 1, this example shows that larger quantities of peroxide and crosslinkage promoter are required to obtain good degrees of crosslinkage:

| Additives | Degrees of Crosslinkage |
|---|---|
| 1% TAC + 0.5% perb. | 0.6% |
| 1% TAC + 1% perb. | 1.5% |
| 1% TAC + 2% perb. | 7.8% |
| 1% TAC + 3% perb. | 15% |
| 1% TAC + 4% perb. | 78% |
| 1% TAC + 6% perb. | 74% |
| 1% TAC + 8% perb. | 79% |
| 1% TAC + 10% perb. | 78% |
| 2% TAC + 0.5% perb. | 2.5% |
| 2% TAC + 1% perb. | 3.8% |
| 2% TAC + 2% perb. | 13% |
| 2% TAC + 3% perb. | 57% |
| 2% TAC + 4% perb. | 64% |
| 2% TAC + 6% perb. | 68% |
| 2% TAC + 8% perb. | 67% |
| 2% TAC + 10% perb. | 82% |
| 3% TAC + 0.5% perb. | 2.5% |
| 3% TAC + 1% perb. | 10% |
| 3% TAC + 2% perb. | 49% |
| 3% TAC + 3% perb. | 82% |
| 3% TAC + 4% perb. | 77% |
| 3% TAC + 6% perb. | 79% |
| 3% TAC + 8% perb. | 79% |
| 3% TAC + 10% perb. | 81% |
| 4% TAC + 0.5% perb. | 5% |
| 4% TAC + 1% perb. | 14% |
| 4% TAC + 2% perb. | 58% |
| 4% TAC + 3% perb. | 76% |
| 4% TAC + 4% perb. | 77% |
| 4% TAC + 5% perb. | 83% |
| 4% TAC + 6% perb. | 83% |
| 4% TAC + 7% perb. | 84% |
| 4% TAC + 8% perb. | 85% |
| 4% TAC + 9% perb. | 78% |
| 4% TAC + 10% perb. | 82% |
| 5% TAC + 0.5% perb. | 10% |
| 5% TAC + 1% perb. | 39% |
| 5% TAC + 2% perb. | 72% |

-continued

| Additives | Degrees of Crosslinkage |
|---|---|
| 5% TAC + 3% perb. | 78% |
| 5% TAC + 4% perb. | 81% |
| 5% TAC + 5% perb. | 82% |
| 5% TAC + 6% perb. | 84% |
| 5% TAC + 7% perb. | 84% |
| 5% TAC + 8% perb. | 84% |
| 5% TAC + 9% perb. | 79% |
| 5% TAC + 10% perb. | 74% |
| 5% TAC + 15% perb. | 75% |
| 5% TAC + 20% perb. | 80% |

EXAMPLE 3

Attempts were made to crosslink polystyrene powder (melt index $(200/5.0)=9$ g/10 min) for 40 minutes at 195° to 200° C. under nitrogen by means of combinations of triallyl cyanurate (=TAC) with the 4 typical crosslinking peroxides 2,5-bis-(tert.-butylperoxy)-2,5-dimethylhexane (=Lup. 101) (10 hHT=119° C.), 2,5-bis(tert.-butylperoxy)-2,5-dimethylhexyne-(3) (=Lup. 130) (10 hHT=128° C.), $\alpha,\alpha'$-bis(tert.-butylperoxy)-diisopropylbenzene (=Lup. 802) (10 hHT=120° C.), and dicumyl peroxide (=Dicup) (10 hHT=115° C.).

Example 3 demonstrates the extraordinarily surprising fact that the best crosslinking peroxides are not capable of crosslinking polystyrene; it should be noted that the 10 hour halflife temperatures thereof are above 106° C.

| Additives | | Degrees of Crosslinkage |
|---|---|---|
| (A) 2% TAC + 0.5% Lup. 101 | | 3% |
| 3% TAC + 0.5% Lup. 101 | | 8% |
| 3% TAC + 1% Lup. 101 | | 7% |
| 3% TAC + 2% Lup. 101 | | 7% |
| 3% TAC + 3% Lup. 101 | | 9% |
| 4% TAC + 1% Lup. 101 | | 9% |
| 4% TAC + 2% Lup. 101 | | 10% |
| 4% TAC + 3% Lup. 101 | | 13% |
| 4% TAC + 4% Lup. 101 | | 13% |
| 5% TAC + 1% Lup. 101 | | 10% |
| 5% TAC + 2% Lup. 101 | | 12% |
| 5% TAC + 3% Lup. 101 | | 15% |
| 5% TAC + 4% Lup. 101 | | 17% |
| 5% TAC + 5% Lup. 101 | | 15% |
| 5% TAC + 3% Lup. 101 | (corresponding to about 4% perb.) | 12% |
| 6% TAC + 3% Lup. 101 | (corresponding to about 4% perb.) | 13% |
| 7% TAC + 3% Lup. 101 | (corresponding to about 4% perb.) | 34% |
| 8% TAC + 3% Lup. 101 | (corresponding to about 4% perb.) | 37% |
| (B) 5% TAC + 3% Lup. 130 | (corresp. about 4% perb.) | 2% |
| 6% TAC + 3% Lup. 130 | (corresp. to about 4% perb.) | 4% |
| 7% TAC + 3% Lup. 130 | (corresp. to 4% perb.) | 6% |
| 8% TAC + 3% Lup. 130 | (corresp. to about 4% perb.) | 7% |
| (C) 5% TAC + 3% Lup. 802 | (corresp. to about 4% perb.) | 6% |
| 6% TAC + 3% Lup. 802 | (corresp. to about 4% perb.) | 6% |
| 7% TAC + 3% Lup. 802 | (corresp. to about 4% perb.) | 11% |
| 8% TAC + 3% Lup. 802 | (corresp. to about 4% perb.) | 10% |
| (D) 5% TAC + 5.5% Dicup | (corresp. to about 4% perb.) | 3% |
| 6% TAC + 5.5% Dicup | (corresp. to about 4% perb.) | 5% |

-continued

| Additives | | Degrees of Crosslinkage |
|---|---|---|
| 7% TAC + 5.5% Dicup | (corresp. to about 4% perb.) | 5% |
| 8% TAC + 5.5% Dicup | (corresp. to about 4% perb.) | 6% |

EXAMPLE 4

Attempts were made to crosslink powdered polystyrene (melt index 200/5.0)=9 g/10 min) for 40 minutes at 195° to 200° C. under nitrogen by means of combinations of the azo esters 2,2'-azo-bis(2-acetoxy-4-methylpentane) (=Luazo AMP) (10 hHT=about 179° C.) and 2,2'-azo-bis(2-propionoxy-4-methylpentane) (=Luazo PMP) (10 hHT=about 185° C.) and triallyl cyanurate (=TAC).

Example 4 demonstrates the equally surprising fact that the agents Luazo AMP (10 hHT=179° C., i.e. above 106° C.) and Luazo PMP (10 hHT=about 185° C.) effective in the crosslinkage of polymers, such as polyethylene, EPDM, or polypropylene, are just as unsuited for crosslinking polystyrene as are the typical crosslinking peroxides tested in the preceding Example 3.

| Additives | Degrees of Crosslinkage |
|---|---|
| (A) by TAC + Luazo AMP | |
| 7.5% TAC + 1% Luazo AMP | 1.2% |
| 7.5% TAC + 2% Luazo AMP | 3.9% |
| 7.5% TAC + 3% Luazo AMP | 4.7% |
| 7.5% TAC + 4% Luazo AMP | 0.7% |
| 7.5% TAC + 5% Luazo AMP | 0.5% |
| (B) by TAC + Luazo PMP | |
| 7.5% TAC + 1% Luazo PMP | 1.1% |
| 7.5% TAC + 2% Luazo PMP | 0.4% |
| 7.5% TAC + 3% Luazo PMP | 0.7% |
| 7.5% TAC + 4% Luazo PMP | 1.6% |
| 7.5% TAC + 5% Luazo PMP | 1.0% |

EXAMPLE 5

Polystyrene powder (melt index 200/5.0)=9 g/10 min) was crosslinked for 40 minutes at 195° to 200° C. with combinations of various quantities of tert.-butyl peroxybenzoate (=perb) as crosslinking agent and triallyl cyanurate (=TAC) as crosslinkage promoter, in one test series in an open porcelain bowl (i.e. in the presence of atmospheric oxygen), in the other test series under nitrogen in ampoules, for comparison.

This example shows that polystyrene can be crosslinked also in the presence of oxygen, but that then the degrees of crosslinkage are markedly lower than those obtained in the absence of oxygen.

| | Degrees of Crosslinkage | |
|---|---|---|
| Additives | in open bowl (i.e. in air) | in ampoules (under nitrogen) |
| 3% perb. + 5% TAC | 25% | (74%) |
| 4% perb. + 7% TAC | 40% | (78%) |
| 4% perb. + 8% TAC | 37% | (73%) |
| 4% perb. + 9% TAC | 35% | (76%) |
| 4% perb. + 10% TAC | 33% | (71%) |
| 5% perb. + 9% TAC | 33% | (72%) |

EXAMPLE 6

Polystyrene powder (melt index (200/5.0)=9 g/10 min) was crosslinked for 40 minutes at 150° C. and at 195° to 200° C. under nitrogen by means of combinations of tert.-butyl peroxybenzoate (=perb) and a considerable number of various bifunctional and trifunctional crosslinkage promoters.

This example demonstrates that divinylbenzene effects a degree of crosslinkage as high as 70%, even when used in an amount as low as 1%, while the degrees of crosslinkage are lower (66% and 53%) when divinylbenzene is used in larger amounts (3% and 4%, respectively). Moreover, it is evident that the other bifunctional crosslinkage promoters bring about acceptable degrees of crosslinkage only when used in larger quantities. It is also evident that at the higher temperature of 195° C. to 200° C. less satisfactory degrees of crosslinkage are attained than at the lower temperature of 150° C.

| Additives | Degrees of Crosslinkage | |
|---|---|---|
| (A) With 4% Perbenzoate + 1% Crosslinkage Promoter at 150° C. | | |
| 4% perb. + 1% triallyl trimellitate | 34% | |
| 4% perb. + 1% diallyl isophthalate | 0.2% | |
| 4% perb. + 1% diallyl terephthalate | 3.3% | |
| 4% perb. + 1% triallyl phosphate | 54% | |
| 4% perb. + 1% triallyl cyanurate | 46% | |
| 4% perb. + 1% triallyl isocyanurate | 23% | |
| 4% perb. + 1% trimethylolpropane trimethacrylate | 2.0% | |
| 4% perb. + 1% ethylene glycol dimethacrylate | 2.0% | |
| 4% perb. + 1% diallyl azelate | 2.4% | |
| 4% perb. + 1% diallyl adipate | 2.1% | |
| 4% perb. + 1% diallyl glutarate | 1.8% | |
| 4% perb. + 1% diallylmaleate | 14% | |
| 4% perb. + 1% m-phenylene bismaleimide | 20% | |
| 4% perb. + 1% hexamethylene bis-maleimide | 3.3% | |
| 4% perb. + 1% 4,4'-bismaleimido diphenylmethane | 11.5% | |
| 4% perb. + 1% divinylbenzene | 70% | |
| 4% perb. + 1% trimethylolpropane triacrylate | 4% | |
| (B) With 4% Perbenzoate + 3% Crosslinkage Promoter at | 150° C. | 195–200° C. |
| 4% perb. + 3% triallyl trimellitate | 60% | 32% |
| 4% perb. + 3% diallyl isophthalate | 3% | — |
| 4% perb. + 3% diallyl terephthalate | 30% | 20% |
| 4% perb. + 3% triallyl phosphate | 72% | — |
| 4% perb. + 3% triallyl cyanurate | 82% | 58% |
| 4% perb. + 3% triallyl isocyanurate | 67% | 27% |
| 4% perb. + 3% trimethylolpropane trimethacrylate | 30% | 9% |
| 4% perb. + 3% ethylene glycol dimethacrylate | 33% | 12% |
| 4% perb. + 3% diallyl azelate | 16% | 24% |
| 4% perb. + 3% diallyl adipate | 24% | 14% |
| 4% perb. + 3% diallyl glutarate | 17% | 14% |
| 4% perb. + 3% diallyl maleate | 69% | 35% |
| 4% perb. + 3% m-phenylene bismaleimide | 30% | 6% |
| 4% perb. + 3% hexamethylene bis-maleimide | 18% | 7% |
| 4% perb. + 3% 4,4'-bismaleimido diphenylmethane | 57% | 15% |
| 4% perb. + 3% divinylbenzene | 66% | 57% |
| 4% perb. + 3% trimethylolpropane triacrylate | 28% | 8% |
| (C) With 5% Perbenzoate + 4% Crosslinkage Promoter at 150° C. | | |
| 5% perb. + 4% triallyl trimellitate | 61% | |

-continued

| Additives | Degrees of Crosslinkage |
|---|---|
| 5% perb. + 4% diallyl isophthalate | 63% |
| 5% perb. + 4% diallyl terephthalate | 63% |
| 5% perb. + 4% triallyl phosphate | 72% |
| 5% perb. + 4% triallyl cyanurate | 77% |
| 5% perb. + 4% triallyl isocyanurate | 72% |
| 5% perb. + 4% trimethylolpropane trimethacrylate | 29% |
| 5% perb. + 4% ethylene glycol dimethacrylate | 42% |
| 5% perb. + 4% diallyl azelate | 56% |
| 5% perb. + 4% diallyl adipate | 64% |
| 5% perb. + 4% diallyl glutarate | 63% |
| 5% perb. + 4% diallyl maleate | 81% |
| 5% perb. + 4% m-phenylene bismaleimide | 67% |
| 5% perb. + 4% hexamethylene bis-maleimide | 13% |
| 5% perb. + 4% 4,4'-bismaleimido-diphenyl-methane | 70% |
| 5% perb. + 4% divinylbenzene | 53% |
| 5% perb. + 4% trimethylolpropane triacrylate | 41% |

(D) With 5% Perbenzoate + 5% Crosslinkage Promoter at 150° C.

| | |
|---|---|
| 5% perb. + 5% trimethylolpropane trimethacrylate | 45% |
| 5% perb. + 5% ethylene glycol dimethacrylate | 54% |
| 5% perb. + 5% hexamethylene bis-maleimide | 47% |

(E) With 5% Perbenzoate + 5% Crosslinkage Promoter at 150° C.

| | |
|---|---|
| 5% perb. + 7% trimethylolpropane trimethacrylate | 44% |
| 5% perb. + 7% ethylene glycol dimethacrylate | 56% |
| 5% perb. + 7% hexamethylene bis-maleimide | 59% |
| 5% perb. + 7% trimethylolpropane triacrylate | 61% |

(F) With 6% Perbenzoate + 5% Crosslinkage Promoter at 150° C.

| | |
|---|---|
| 6% perb. + 5% trimethylolpropane trimethacrylate | 42% |
| 6% perb. + 5% ethylene glycol dimethacrylate | 46% |
| 6% perb. + 5% hexamethylene bis-maleimide | 44% |
| 6% perb. + 5% trimethylolpropane triacrylate | 53% |

EXAMPLE 7

Polystyrene powder (melt index (200/5.0)=9 g/10 min) was crosslinked for 40 minutes at 150° C. and at 195° to 200° C. under nitrogen by combinations of triallyl cyanurate (=TAC) and triallyl phosphate (=TAPA) and divinylbenzene, respectively, and a considerable number of equivalent quantities of various peroxides.

Example 7 demonstrates that aromatic peresters (perbenzoate, o-methylperbenzoate) and aromatic diacyl peroxides (benzoyl peroxide, o-methylbenzoyl peroxide) exhibit the best crosslinking activity, percarbonate esters (O,O-tert.-butyl-O-2-ethylhexyl monoperoxy carbonate) also have good activity, while aliphatic peresters (perisononanoate, peroctoate), and also aliphatic diacyl peroxides (isononanoyl peroxide, decanoyl peroxide) exhibit markedly lower crosslinking activity, among the perketals only the two lowest starting ones, viz. the two cycloaliphatic ones, are capable of developing moderate crosslinking activity, and the ether peroxide 1-tert.-butylperoxy-1-methoxy-3,3,5-trimethylcyclohexane likewise exhibits only moderate crosslinking activity.

(A) At 150° C. with 3% Crosslinkage Promoter + 4% Perbenzoate or Equivalent Quantities of Other Peroxides

| | Peroxide | Degree of Crosslinkage with | |
|---|---|---|---|
| | | 3% TAC | 3% TAPA |
| 4% | tert.-butyl peroxybenzoate | 72% | 78% |
| 4.29% | tert.-butylperoxy-o-methyl benzoate | 79% | 73% |
| 3,01 | 3,3-bis(tert.-butylperoxy) ethyl butyrate | 3% | 5% |
| 6.02% | 3,3-bis(tert.-butylperoxy) ethyl butyrate | 1% | 1% |
| 3.44% | 4,4-bis(tert.-butylperoxy) n-butyl valerate | 4% | 2% |
| 6.88% | 4,4-bis(tert.-butylperoxy) n-butyl valerate | 1% | 1% |
| 2.41% | 2,2-bis(tert.-butylperoxy) butane | 8% | 4% |
| 4.82% | 2,2-bis(tert.-butylperoxy) butane | 2% | 1% |
| 2,68% | 1,1-bis(tert.-butylperoxy) cyclohexane | 6% | 11% |
| 5,36% | 1,1-bis(tert.-butylperoxy) cyclohexane | 27% | 13% |
| 3.11% | 1,1-bis(tert.-butylperoxy)-3,3,5-trimethylcyclohexane | 14% | 44% |
| 6.22% | 1,1-bis(tert.-butylperoxy)-3,3,5-trimethylcyclohexane | 38% | 10% |
| 5.07% | O,O-tert.-butyl-O-2-ethylhexyl monoperoxycarbonate | 76% | 58% |
| 4.45% | O,O-tert.-butyl-O-cyclohexyl monoperoxycarbonate | 59% | 61% |
| 4.74% | tert.-butylperoxy-3,5,5-trimethyl hexanoate | 13% | 28% |
| 4.45% | tert.-butylperoxy-2-ethyl hexanoate | 9% | 17% |
| 4.99% | bis(benzoyl)peroxide (paste) | 53% | 67% |
| 5.57% | bis(o-methylbenzoyl) peroxide | 65% | 74% |
| 6.48% | bis(3,5,5-trimethylhexanoyl) peroxide | 3% | 3% |
| 7.05% | bis(decanoyl) peroxide | 16% | 13% |

(B) At 150° C. with 4% Crosslinkage Promoter + 5% Perbenzoate or Equivalent Quantities of Other Peroxides

| | Peroxide | Degree of Crosslinkage with | |
|---|---|---|---|
| | | 4% TAC | 4% TAPA |
| 5% | tert.-butyl peroxybenzoate | 79% | 75% |
| 5.35% | tert.-butylperoxy-o-methylbenzoate | 71% | 74% |
| 3.67% | 3,3-bis(tert.-butylperoxy) ethyl butyrate | 2% | 2% |
| 7.52% | 3,3-bis(tert.-butylperoxy) ethyl butyrate | 1% | 1% |
| 4.30% | 4,4-bis(tert.-butylperoxy) n-butyl valerate | 1% | 2% |
| 8.60% | 4,4-bis(tert.-butylperoxy) n-butyl valerate | 1% | 1% |
| 3.20% | 2,2-bis(tert.-butylperoxy) butane | 21% | 14% |
| 6.04% | 2,2-bis(tert.-butylperoxy) butane | 1% | 2% |
| 3.35% | 1,1-bis(tert.-butylperoxy) cyclohexane | 13% | 36% |
| 6.70 | 1,1-bis(tert.-butylperoxy) cyclohexane | 40% | 43% |
| 3.89% | 1,1-bis(tert.-butylperoxy)-3,3,5-trimethyl cyclohexane | 23% | 49% |
| 7.78% | 1,1-bis(tert.-butylperoxy)-3,3,5-trimethyl cyclohexane | 26% | 12% |
| 6.34% | O,O-tert.-butyl-O-2-ethylhexyl monoperoxycarbonate | 57% | 56% |
| 5.57% | O,O-tert.-butyl-O-cyclohexyl monoperoxycarbonate | 64% | 64% |
| 5.93% | tert.-butylperoxy-3,5,5-trimethyl hexanoate | 26% | 43% |
| 5.57% | tert-butylperoxy-2-ethylhexanoate | 37% | 43% |

-continued

| | | 57% | 75% |
|---|---|---|---|
| 6.23% | bis(benzoyl) peroxide (paste) | 57% | 75% |
| 6.96% | bis(o-methylbenzoyl) peroxide | 49% | 78% |
| 8.09% | bis(3,5,,5-trimethylhexanoyl) peroxide | 3% | 26% |
| 8.82% | bis(decanoyl) peroxide | 39% | 32% |
| 6.30% | 1-tert.-butylperoxy-1-methoxy-3,3,5-trimethylcyclohexane | 41% | 50% |

(C) At 195 to 200° C. with 3% Crosslinkage Promoter + 4% Perbenzoate or Equivalent Quantities of Other Peroxides

| | Degree of Crosslinkage with | |
|---|---|---|
| Peroxide | 3% TAC | 3% Divinylbenzene |
| 4% tert.-butyl peroxybenzoate | 71% | 53% |
| 4.29% tert.-butyl peroxy-o-methyl benzoate | 54% | 69% |
| 3,01% 3,3-bis(tert.-butylperoxy) ethyl butyrate | 15% | — |
| 6.02% 3,3-bis(tert.-butylperoxy) ethyl butyrate | 1% | 3% |
| 3.44% 4,4-bis(tert.-butylperoxy) n-butyl valerate | 4% | — |
| 6.88% 4,4-bis(tert.-butylperoxy) n-butyl valerate | 1% | — |
| 2.41% 2,2-bis(tert.-butylperoxy) butane | 7% | — |
| 4.82% 2,2-bis(tert.-butylperoxy) butane | 2% | 14% |
| 2.68% 1,1-bis(tert.-butylperoxy) cyclohexane | 8% | — |
| 5.36% 1,1-bis(tert.-butylperoxy) cyclohexane | 18% | 48% |
| 3.11% 1,1-bis(tert.-butylperoxy)-3,3,5-trimethyl cyclohexane | 8% | — |
| 6.22% 1,1-bis(tert.-butylperoxy)-3,3,5-methyl cyclohexane | 15% | 54% |
| 5.07% 0.0-tert.-butyl-0-2-ethylhexyl monoperoxycarbonate | 48% | 52% |
| 4.45% 0,0-tert.-butyl-0-cyclohexyl-monoperoxycarbonate | 59% | — |
| 4.74% tert.-butylperoxy-3,5,5-trimethyl hexanoate | 17% | — |
| 4.45% tert.-butylperoxy-2-ethylhexanoate | 19% | — |
| 4.99% bis(benzoyl) peroxide (paste) | 48% | 78% |
| 5.57% bis(o-methylbenzoyl) peroxide | 46% | 68% |
| 6,48% bis(3,5,5-trimethylhexanoyl) peroxide | 2% | 17% |
| 7.05% bis(decanoyl) peroxide | 27% | 27% |

(D) At 150° C. with 5% Crosslinkage Promoter + 6% Perbenzoate or Equivalent Quantities of Other Peroxides

| | Degree of Crosslinkage with | |
|---|---|---|
| Peroxide | 5% TAC | 5% TAPA |
| 6% tert.-butyl peroxybenzoate | 85% | 69% |
| 4.02% 1,1-bis(tert.-butylperoxy) cyclohexane | 29% | 61% |
| 8.04% 1,1-bis(tert.-butylperoxy) cyclohexane | 45% | 54% |
| 4.67% 1,1-bis(tert.-butylperoxy)-3,3,5-trimethyl cyclohexane | 54% | 69% |
| 9.34% 1,1-bis(tert.-butylperoxy)-3,3,5-trimethyl cyclohexane | 58% | 25% |
| 7.11% tert.-butylperoxy-3,5,5-trimethyl hexanoate | 37% | 65% |
| 6.68% tert.-butylperoxy-2-ethyl hexanoate | 20% | 71% |
| 9.71% bis(3,5,5-trimethylhexanoyl) peroxide | 19% | 41% |
| 10.58% bis(decanoyl) peroxide | 52% | 50% |

(E) At 195-200° C. with 4% Divinylbenzene + 2% Aliphatic Diacyl Peroxides Quantitatively Equivalent to 5% Perbenzoate

| Peroxide | Degree of Crosslinkage with 4% Divinylbenzene |
|---|---|
| 8.09% bis(3,5,5-trimethylhexanoyl) peroxide | 31% |
| 8.82% bis(decanoyl) peroxide | 37% |

EXAMPLE 8

Polystyrene powder (melt index (200/0.5)=9 g/10 min) was crosslinked for 40 minutes at 150° C. and 195° to 200° C. under nitrogen by means of combinations of various crosslinkage promoters and various peroxides in the presence of an antioxidant (TBK=2,6-di-tert.-butyl-p-cresol).

From (B) it is apparent that at 150° C. better degrees of crosslinkage are attained than at 195° to 200° C., and that by the addition of antioxidant the degree of crosslinkage is reduced only little and, moreover, that with increasing quantities of antioxidant the degree of crosslinkage decreases somewhat.

From (C) reporting results of various combinations of crosslinkage promoter + peroxide it is apparent that the addition of 0.1% TBK antioxidant lowers, increases, or has no influence on the degree of crosslinkage, respectively.

| (A) Additives | Degrees of Crosslinkage at 150° C. |
|---|---|
| 0.01% TBK-antioxidant | 0.3% |
| 0.1% TBK-antioxidant | 0.5% |
| 0.3% TBK-antioxidant | 0.3% |
| 0.1% TBK + 4% tert.-butyl peroxy benzoate (= perb.) | 0% |
| 0.3% TBK + 4% tert.-butyl peroxy benzoate (= perb.) | 0% |
| 1% TBK + 4% tert.-butyl peroxy benzoate (= perb.) | 0% |
| 2% TBK + 4% tert.-butyl peroxy benzoate (= perb.) | 0,5% |
| 3% TBK + 4% tert.-butyl peroxy benzoate (= perb.) | 0,1% |
| 0.1% TBK + 3% Triallylcyanurate (= TAC) | 0,5% |
| 0.3% TBK + 3% Triallylcyanurate (= TAC) | 0,5% |

| | Degrees of Crosslinkage | |
|---|---|---|
| (B) Additives | 150° C. | 195–200° C. |
| 3% TAC + 4% perb. (without TBK-antioxidant) | 79% | 67% |
| 3% TAC + 4% perb. + 0.01% TBK | 81% | 49% |
| 3% TAC + 4% perb. + 0.1% TBK | 78% | 56% |
| 3% TAC + 4% perb. + 0.3% TBK | 72% | 28% |

| (C) Additives (Equivalent Amounts of Peroxide) | Degrees of Crosslinkage at 150° C. | |
|---|---|---|
| | with 0.1% TBK | without TBK |
| 3% diallyl maleate + 4% tert.-butyl peroxybenzoate | 37% | 58% |
| 3% triallyl trimellitate + 5.07% 0,0-tert.-butyl-0-2-ethyl-hexyl monoperoxycarbonate | 37% | 33% |
| 3% triallyl isocyanurate + 4.45% 0,0-tert.-butyl-0-cyclo-hexyl monoperoxycarbonate | 55% | 43% |
| 3% divinylbenzene + 4.99% bis(benzoyl) peroxide | 75% | 78% |
| 3% triallyl phosphate + 5.57% bis(o-methylbenzoyl) peroxide | 56% | 58% |
| 3% triallyl cyanurate + 4.29% tert.-butylperoxy-o-methylbenzoate | 44% | 61% |
| 3% divinylbenzene + 4% tert.-butyl peroxybenzoate | 63% | 56% |
| 3% diallyl maleate + 4.99% bis(benzoyl) peroxide | 54% | 52% |
| 3% triallylphosphate + 4% tert.-butyl peroxybenzoate | 73% | 74% |
| 3% triallyl cyanurate + 4% tert.-butyl peroxybenzoate | 72% | 68% |
| 3% triallyl isocyanurate + | 56% | 53% |

| | | |
|---|---|---|
| 4% tert.-butyl peroxybenzoate | | |
| 3% triallyl cyanurate + | 61% | 73% |
| 5.07% O,O-tert-butyl-O-2- | | |
| ethylhexyl monoperoxycarbonate | | |

EXAMPLE 9

This example describes the crosslinkage of impact-resistant polystyrene. Since the four types of impact-resistant polystyrene employed could not be ground to powder with the available equipment—as explained above—2 grams of impact-resistant granulated polystyrene, all the additives, and 8 ml acetone were filled into a wide test tube, the test tube was sealed, left to stand overnight, and the acetone was completely removed at 70° C. during a period of 15 hours. Crosslinkage and everything else takes place in the conventional manner.

The four impact-resistant types PS 454 C PS 475 K, PS 586 G and PS 436 C of granulated polystyrene manufactured by BASF AG and constituting graft polymers of styrene to polybutadiene and containing about 20% polybutadiene were crosslinked for 40 minutes at 150° and 195° C., respectively, under nitrogen by means of a combination of 3% triallyl cyanurate (=TAC) and 4% tert.-butyl peroxybenzoate (=perbenzoate).

| | Degrees of Crosslinkage at | |
|---|---|---|
| Additives | 150° C. | 195° C. |
| (A) PS 454 C none | 0.6% | |
| PS 475 K none | 0,5% | |
| PS 586 G none | 0,1% | |
| PS 436 C none | 0,2% | |
| (B) PS 454 C 3% TAC | 0,8% | |
| PS 475 K 3% TAC | 0,8% | |
| PS 586 G 3% TAC | 1.0% | |
| PS 436 C 3% TAC | 0.4% | |
| (C) PS 454 C 4% perbenzoate | 1.5% | |
| PS 475 K 4% perbenzoate | 1.8% | |
| PS 586 G 4% perbenzoate | 4.2% | |
| PS 436 C 4% perbenzoate | 0.6% | |
| (D) PS 454 C 3% TAC + 4% perbenzoate | 75% | — |
| PS 475 K 3% TAC + 4% perbenzoate | 80% | — |
| PS 586 G 3% TAC + 4% perbenzoate | 77% | 76% |
| PS 436 C 3% TAC + 4% perbenzoate | 75% | — |

EXAMPLE 10

In this example the minimum crosslinking temperature was determined and is listed under (A), and the minimum crosslinking period was determined and is listed under (B).

Polystyrene powder (melt index (200/5.0)=9 g/10 min) was crosslinked in part (A) for 40 minutes at various temperatures under nitrogen by means of 7% triallyl cyanurate (=TAC) and 4% tert.-butyl peroxybenzoate (=perb), and in part (B) it was crosslinked at 150° C. for various periods under nitrogen by means of 3% triallyl cyanurate (=TAC) and 4% perbenzoate (=perb).

From (A) it is apparent that for a crosslinking period of 40 minutes the minimum crosslinking temperature is about 130° C. and the optimum crosslinking temperature is about 150° C. From (B) it is apparent that at a crosslinking temperature of 150° C. the minimum crosslinking period is from 5 to 10 minutes.

| (A) Crosslinkage with 7% TAC + 4% Perb for 40 min at the following temperatures | Degrees of Crosslinkage |
|---|---|
| 90° C. | 0.3% |
| 100° C. | 0.6% |
| 110° C. | 0.7% |
| 120° C. | 14.6% |
| 130° C. | 46% |
| 140° C. | 64% |
| 150° C. | 66% |
| 160° C. | 64% |
| 170° C. | 63% |
| 180° C. | 59% |
| 190° C. | 54% |
| 195° C. | 53% |
| 200° C. | 51% |
| 205° C. | 50% |
| 210° C. | 47% |
| 220° C. | 45% |
| 230° C. | 42% |

| (B) Crosslinkage with 3% TAC and 4% Perb at 150° C. for the following periods | Degrees of Crosslinkage |
|---|---|
| 5 minutes | 19% |
| 10 minutes | 56% |
| 15 minutes | 66% |
| 20 minutes | 60% |
| 25 minutes | 62% |
| 30 minutes | 60% |
| 35 minutes | 68% |
| 40 minutes | 68% |
| 45 minutes | 74% |
| 50 minutes | 70% |
| 55 minutes | 79% |
| 60 minutes | 78% |

EXAMPLE 11

This example shows the crosslinking activity of combinations of several peroxides with several crosslinkage promoters.

Polystyrene powder (melt index 200/5.0)=9 g/10 min) was crosslinked for 40 minutes at 150° C. under nitrogen by means of combinations of several peroxides and several crosslinkage promoters, the quantities employed corresponding to 5% perbemzoate and 4% triallyl cyanurate.

This example demonstrates that combinations of several peroxides and several crosslinkage promoters bring about very good degrees of crosslinkage, which equal those attained with combinations of one peroxide and one crosslinkage promoter.

Abbreviations:

(a) TAC=triallyl cyanurate, TAPA=triallyl phosphate, DIVYB=divinylbenzene, DAMA=diallyl maleate, (b) Perb=tert.-butyl peroxybenzoate, o-MePerb-=tert.-butylperoxy-o-methylbenzoate, Bp=bis(benzoyl) peroxide, Tbehc=O.O-tert.-butyl-O-2-ethylhexyl monoperoxycarbonate

| Additives (equivalent amounts of peroxide) | Degrees of Crosslinkage |
|---|---|
| 5% Perb + 4% TAC | 77% |
| 5% Perb + 2% TAC + 2% TAPA | 81% |
| 5% Perb + 1,33% TAC + 1,33% TAPA + 1,33% DIVYB | 82% |
| 2,5% Perb + 2,68% o-MePerb + 4% TAC | 73% |
| 2,5% Perb + 2,68% o-MePerb + 2% TAC + 2% TAPA | 7.4% |
| 2,5% Perb + 2,68% o-MePerb + 1,33% TAC + 1,33% TAPA + 1,33% DIVYB | 80% |
| 1,67% Perb + 1,79% o-MePerb + 1,66% Bp + 4% TAC | 59% |

| Additives (equivalent amounts of peroxide) | Degrees of Crosslinkage |
|---|---|
| 1,67% Perb + 2,11% Tbehc + 1,66% Bp + 2% TAC + 2% TAPA | 80% |
| 1,67% Perb + 1,79% o-MePerb + 1,33% TAC + 1,33% DAMA + 1,33% DIVYB | 75% |

EXAMPLE 11

Polystyrene powder (melt index (200/5.0=9 g/10 min) was crosslinked for 40 minutes at 190° C. under nitrogen by means of a combination of 5% tert.-butyl peroxybenzoate (=perb) and 4% triallyl cyanurate (=TAC) in the presence of 5% of 2,2'-azo-bis-(isobutyramide) and 2,2'-azo-bis(ethyl isobutyrate), respectively, as foaming agents.

This example shows that the crosslinkage is not impaired by the foaming agents, and that the degrees of crosslinkage are only slightly below those attained in the absence of foaming agents:

| Additives | Degrees of Crosslinkage |
|---|---|
| 5% perb + 4% TAC | 83% |
| 5% perb + 4% TAC + 5% 2,2'-azo-bis(isobutyramide) | 78% |
| 5% perb + 4% TAC + 5% 2,2'-azo-bis(ethyl isobutyrate) | 75% |

What is claimed:

1. A process of crosslinking and foaming a homopolymer or copolymer selected from the group of polystyrenes, nucleo-substituted polystyrenes, impact-resistant polystyrenes, or mixtures thereof with the exception of p-methylstyrene homopolymers containing a chemically decomposing blowing agent free of amino or hydrazine groups comprising heating said homo- or copolymer at a temperature above 110° C. in the presence of 0.5 to 15% of at least one crosslinking promoter containing at least two active C—C double or C—C triple bonds in the molecule, 0.5 to 15% of at least one organic peroxide having a 10 hour halflife temperature below 106° C. (as determined in benzene) selected from the group of peresters, percarbonate esters, perketals, ether peroxides, diacyl peroxides, and ketone peroxide esters, and optionally foaming agents.

2. Process according to claim 1, characterized by the use of aromatic peresters as peroxides.

3. Process according to claim 1, characterized by the use of aromatic diacyl peroxides as peroxides.

4. Process according to claim 1, characterized by the use of percarbonate esters as peroxides.

* * * * *